A. W. OLSEN.
PNEUMATIC FLANGE OILER FOR CAR WHEELS.
APPLICATION FILED OCT. 23, 1914.
1,167,514.
Patented Jan. 11, 1916.
4 SHEETS—SHEET 1.
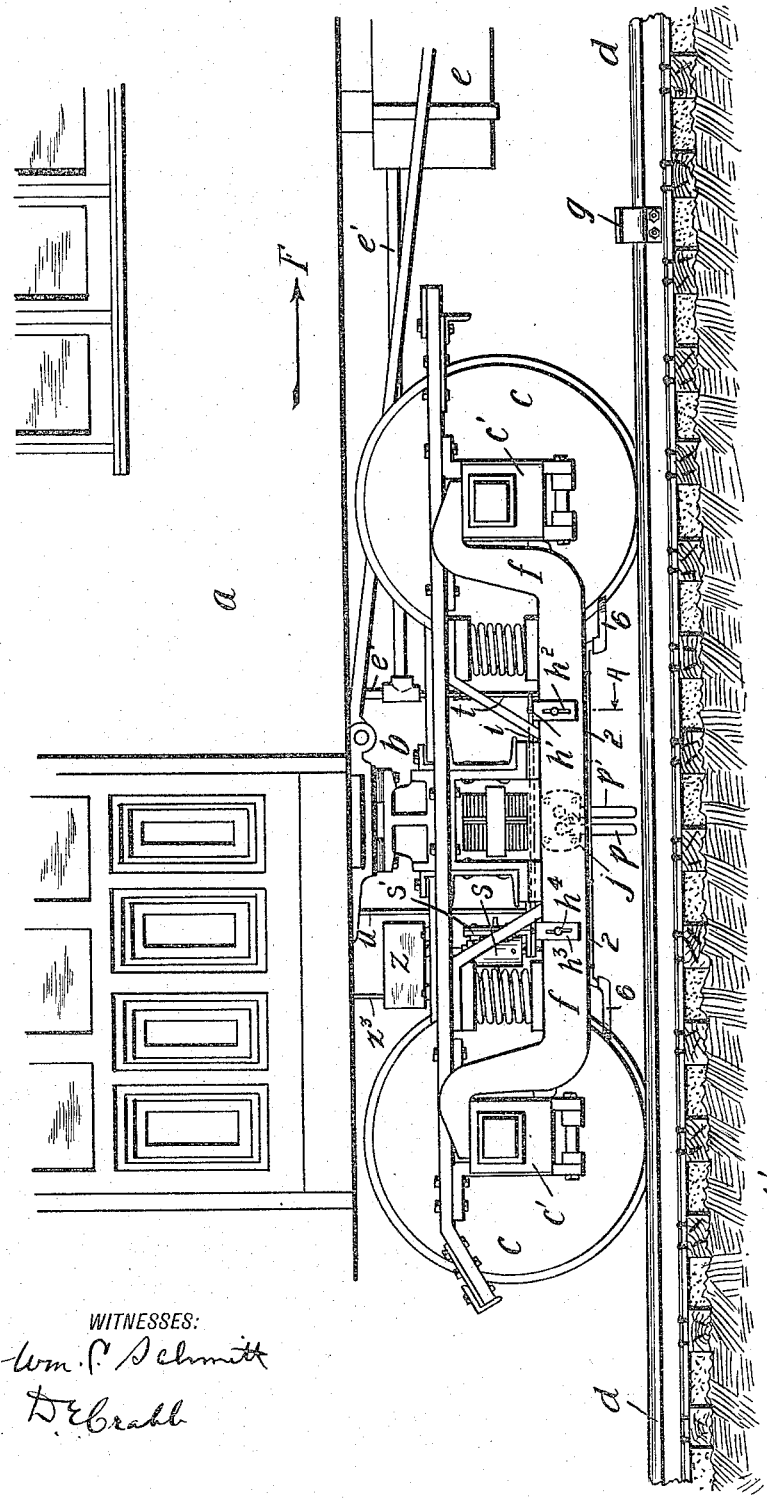
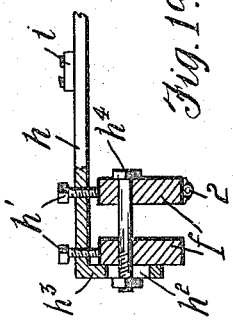
WITNESSES:
INVENTOR
A. W. Olsen,
BY
ATTORNEY

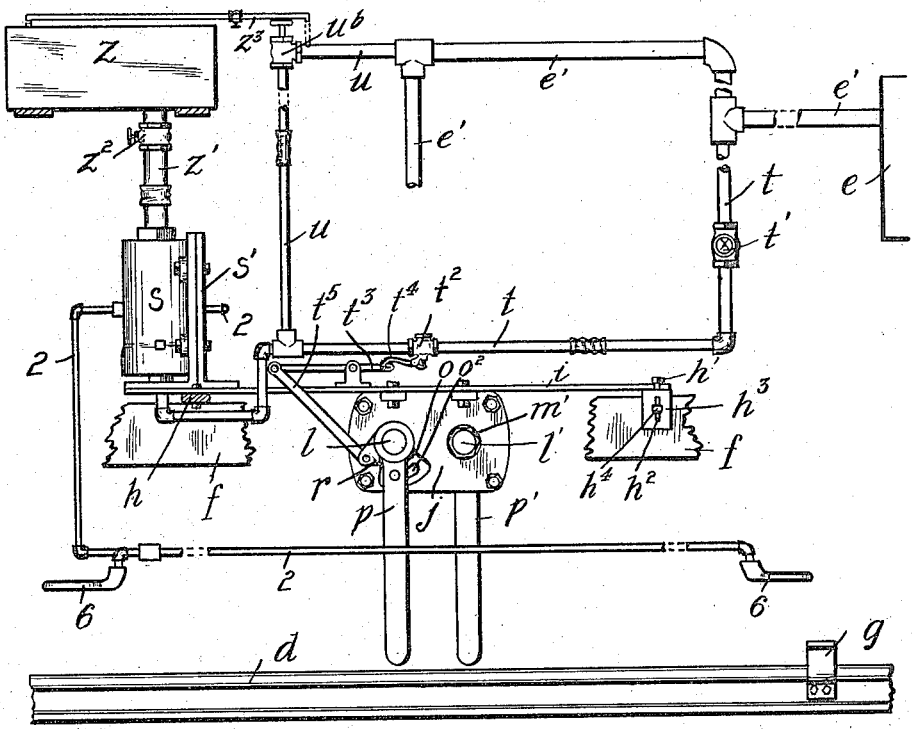
Fig. 2.
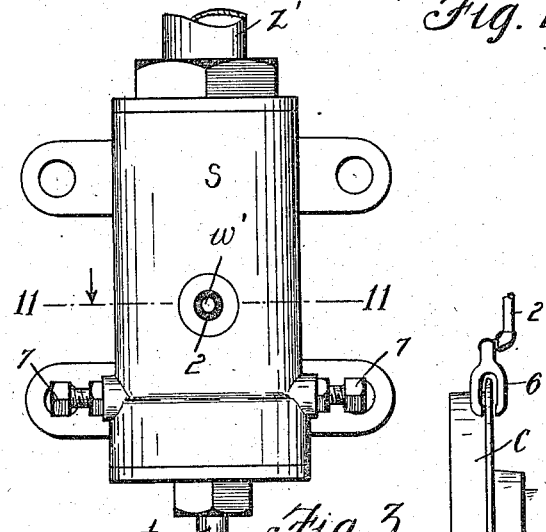
Fig. 3.
Fig. 5.
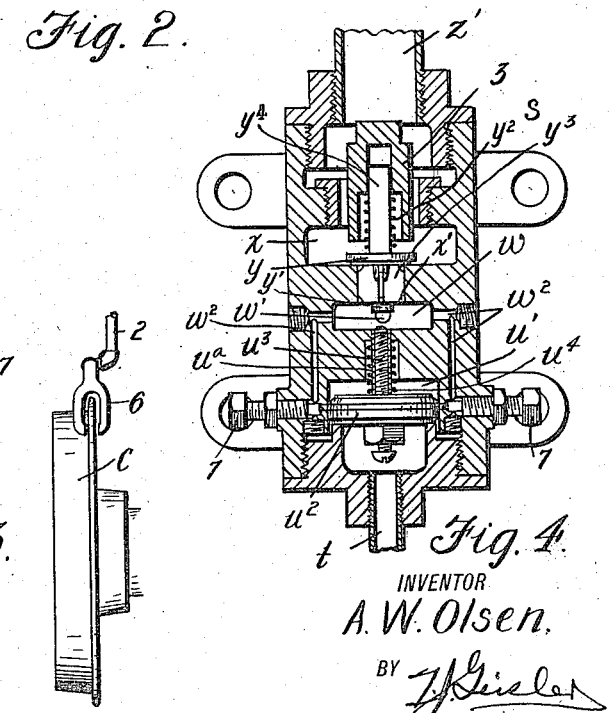
Fig. 4.

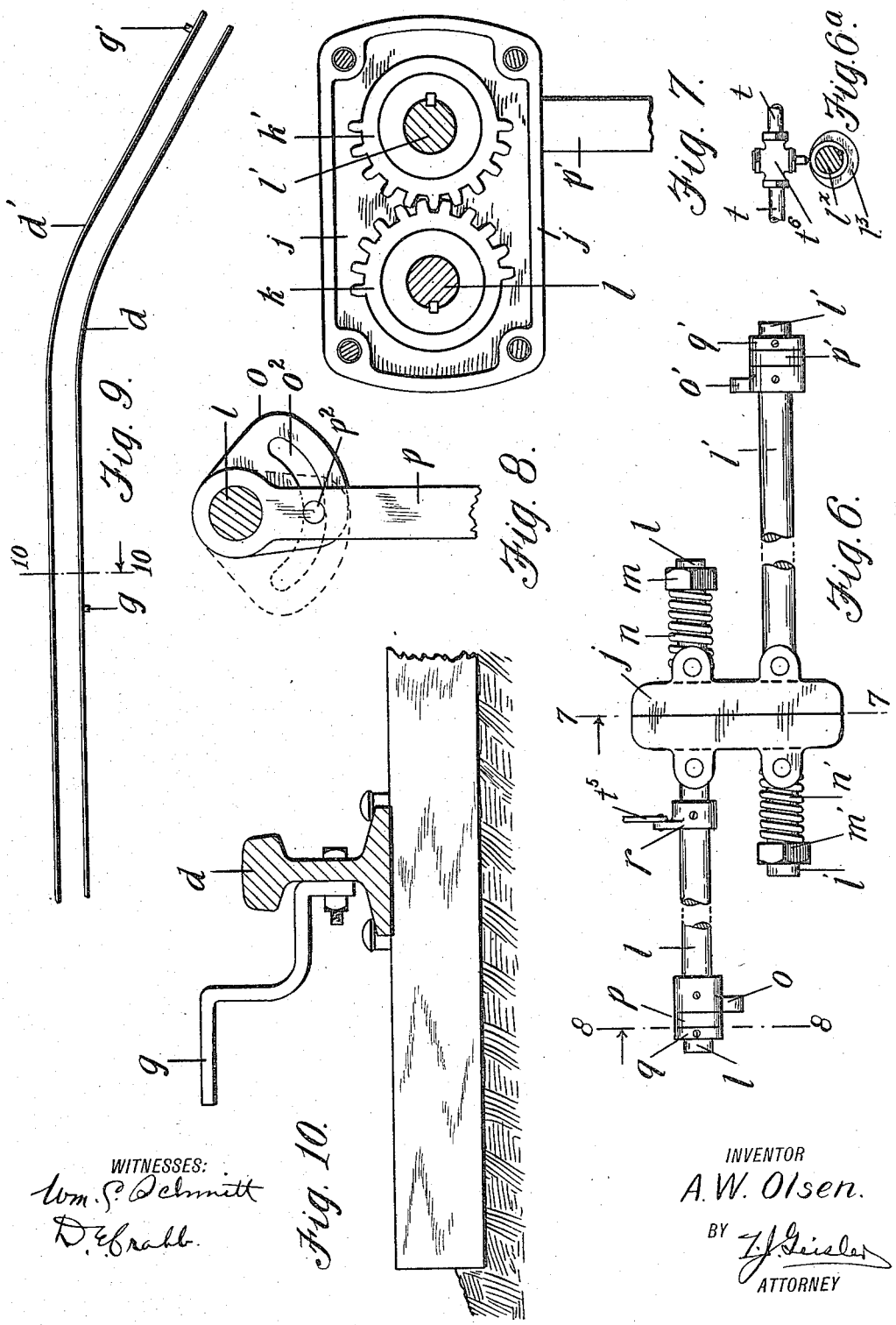

A. W. OLSEN.
PNEUMATIC FLANGE OILER FOR CAR WHEELS.
APPLICATION FILED OCT. 23, 1914.
1,167,514.
Patented Jan. 11, 1916.
4 SHEETS—SHEET 4.
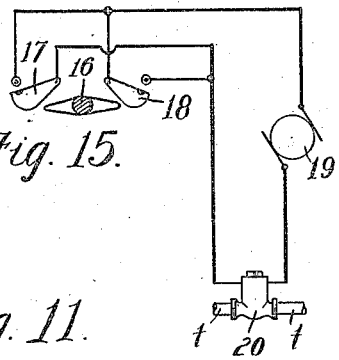
Fig. 15.
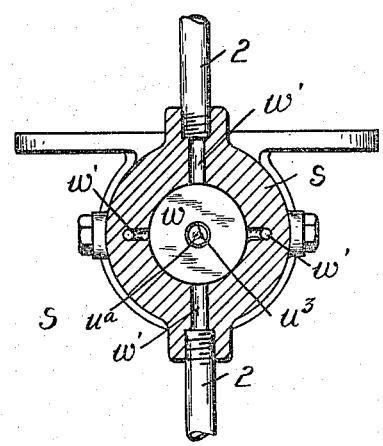
Fig. 11.
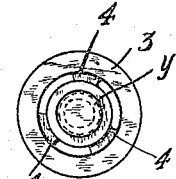
Fig. 12.
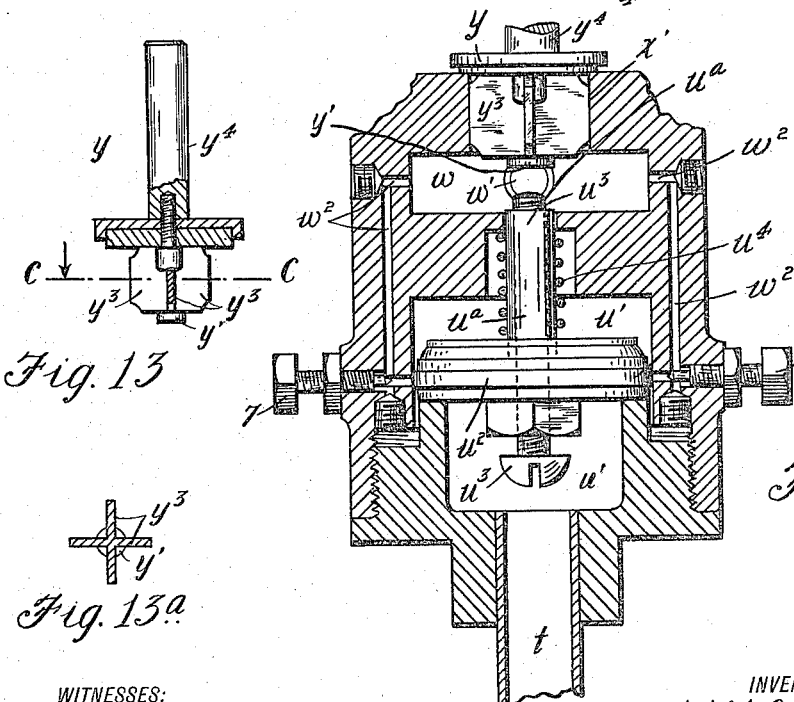
Fig. 13
Fig. 13ª
Fig. 14.
WITNESSES:
INVENTOR
A. W. Olsen.
BY
ATTORNEY

UNITED STATES PATENT OFFICE.

AUGUST W. OLSEN, OF PORTLAND, OREGON.

PNEUMATIC FLANGE-OILER FOR CAR-WHEELS.

1,167,514.   Specification of Letters Patent.   Patented Jan. 11, 1916.

Application filed October 23, 1914.   Serial No. 868,344.

*To all whom it may concern:*

Be it known that I, AUGUST W. OLSEN, a citizen of the United States, and a resident of Portland, Multnomah county, State of Oregon, have invented a new and useful Improvement in Pneumatic Flange-Oilers for Car-Wheels, of which the following is a specification.

My invention relates to lubricating devices for oiling the flanges of locomotive and car wheels, so as to eliminate the frictional resistance imposed on the wheels while running on the curves of the track. It is well known that the undue wear of the rails and of the flanges of the wheels, caused by such curves in the track is very considerable, and therefore, is an important factor in the maintenance of railroad equipment.

One of the main objects of my invention is to provide automatically controlled means for applying a spray of lubricant to both sides of the car wheel flange, both sides being oiled for the reason that both are subjected to wear.

My invention further, has for its object the arranging of the lubricant applying devices so as to apply the lubricant to the flanges of the wheels in the form of a spray.

I prefer to operate my device pneumatically, and to use as the operating force compressed air taken from the pressure tank of the air brake system.

My device is furthermore, so arranged as to be thrown into and out of action by contact with lugs affixed to the rails near the ends of the curves in the trackway.

The details of my invention and its mode of operation are hereinafter fully described.

In the accompanying drawings, constituting a part of this specification, Figure 1, is a fragmental side elevation, showing one end of a railway car mounted on a standard truck, and my device is mounted on the equalizing bars of the latter. My device is shown as operatively connected with the air brake system pressure tank which is located under the car. Fig. 1ª, is a sectional detail view taken approximately on the line A of Fig. 1, and illustrates the manner in which the supporting frame of my device is rendered vertically adjustable with respect to the equalizer bars on which it is mounted. Fig. 2, is a larger-scale side elevation, showing the parts of my invention in their relative position, but omitting all of the truck frame except portions of the equalizer bars. Fig. 3, is a side elevation of the pneumatic oil ejector element of my device; Fig. 4, is a diametrical, vertical section of the same; Fig. 5, is a diagrammatic bottom view of a car wheel, and shows the relative position of the forked nozzle which is provided at each terminal of the oil ejecting pipes that lead from the oil ejector element. This view further shows that the members of this nozzle straddle the flange of the wheel so as to simultaneously spray both of the opposite sides of the flange. Fig. 6, is a plan view of that part of my device by means of which the operation of the device is effected coincidentally with the transit of the car over the ends of a curve in the track. Fig. 6ª, is a detail view showing an alternate method of construction of certain valve operating parts; Fig. 7, is a larger-sized sectional view taken approximately on the line 7—7 of Fig. 6, showing the reversing gear connecting the rotatable shafts which are shown in Fig. 6. Fig. 8, is a larger scaled sectional view taken approximately on the line 8—8 of Fig. 6. The broken lines of this view show the action of the movable parts. Fig. 9, is a diagrammatic plan view of a portion of a railroad track, including a curve, and illustrates the location of the lugs affixed on the rails near the ends of the curve; Fig. 10, is a larger sized cross-sectional view taken on the line 10—10, of Fig. 9. This view shows the detail of the lugs and the manner in which they are affixed to the rails. Fig. 11, is a sectional view taken approximately on the line, 11—11, of Fig. 3. Fig. 12, is a plan view showing a detail of construction of one of the oil ejector element parts. Fig. 13, is a detail of the oil valve which is contained in the oil ejector element shown in Figs. 3 and 4. Fig. 13ª, is a sectional view taken on the line C—C, of Fig. 13; Fig. 14 is a larger sized view of the lower portion of the oil ejector element as illustrated in Fig. 4; and Fig. 15 is a diagrammatic view showing a solenoid operated valve, the energizing circuit of which is adapted to be closed by the relative displacement of the car and truck when rounding a curve.

Referring in the first instance to Fig. 1, $a$, represents one end of a standard railway car mounted on standard running gear comprising a truck frame, $b$, having journal boxes, $c'$, in which are journaled the axles of flanged car-wheels, $c$. $f$, represents the equalizing bars of the truck frame, and $d$, $d'$, represents a section of the track rails upon which the car is adapted to travel, and in this view the car is presumed to be traveling to the right, as indicated by the arrow, F.

My device is mounted on the equalizing bars, $f$, because there is no substantial vibration of these parts relative to the rails, and in order to keep the operating members of my device in substantially constant position with respect to the abutment lugs provided on the track. Since the wheels, $c$, become worn in service and are periodically sent to the shop to be turned down to a smaller diameter, it is desirable that my device be adjustably mounted with respect to the equalizing bars so that they may be adjusted to the right height above the track. This adjustment is made possible by mounting my device on supporting bars, $i$, extending longitudinally with the equalizer bars, $f$. Said bars, $i$, are supported at their ends on cross-bars, $h$, the latter extending transversely between the equalizing bars, $f$. Set-screws, $h'$, adjustably space the bars, $h$, above the bars, $f$. The bent down portions, $h^3$, are provided with slots, $h^2$, by means of which the bars $h$, are rigidly bolted to the equalizing bars, $f$. The bolts $h^4$, must be loosened when any adjustment is to be made.

$e$, represents a pressure air-tank of the usual air-brake system. From such tank extends an air-pipe, $e'$, which conducts the air to the air-brakes, (the latter not being shown in the drawings). The oil ejector element of my device is connected with the pipe, $e'$, by a direct pipe line $t$.

In the pipe, $t$, is a cut-off valve $t'$, and a spring-controlled valve, $t^2$, the latter being normally closed. Said valve $t^2$ is of the "whistle-valve" type and includes an arm, $t^4$, connected to the fulcrumed lever-arm, $t^3$, the latter being connected by a link $t^5$, to a crank-arm, $r$, which is fixed on the parallel shaft $l$. See Figs. 2 and 6. The shafts $l$, $l'$, are journaled in the gear-box, $j$, and are connected by the reversing gears, $k$, $k'$ as shown in Fig. 7. On the outer extremities of the shafts, $l$, $l'$, are rigidly mounted the slotted crank arms, $o$, $o'$. The pendent arms, $p$, $p'$ loosely mounted on the ends of shafts $l$, $l'$, adjacent the slotted arms, $o$, $o'$, respectively, are held against longitudinal displacement by means of collars $q$, $q'$. Mounted on the inner extremities of the shafts, $l$, $l'$, are brake springs, $n$, $n'$, the compression of which is adjusted by lock-nuts, $m$, $m'$. Said brake springs $n$, $n'$, serve to hold the shafts, $l$, $l'$, in any position to which they are rotated and eliminate vibration after such rotation is completed.

On the rails, $d$, $d'$, of the curved track portion, are mounted abutment lugs, $g$, $g'$, respectively, as shown in Fig. 9. The construction of said lugs and the way in which they are bolted to the rails are shown in Fig. 10.

The parts thus far described relate to the means for automatically throwing my device into action when the car is approaching a curve and out of action when the car passes out of said curve. The operation of these parts will be described hereinafter.

I will now describe the pneumatic oil ejecting element, $s$, the construction of which is fully shown in Figs. 3, 4 and 11 to 14, inclusive. Said oil ejecting element is connected at its lower end to the pressure tank, $e$, and at its upper end to an oil supply tank $z$. When in operative state, the compressed air is adapted to intermix with the oil in a chamber provided in said oil ejecting element, and blow the atomized mixture, in the form of a spray, to the wheel flanges. For the purpose of insuring a positive feed of the oil to said chamber, I subject the oil to a fluid pressure through the pipe, $z^3$.

The construction of the oil ejecting element is as follows: In the lower end of the element is a piston chamber, $u'$, directly connected by the pipes, $t$, and $e'$, with the compressed air tank, $e$. In the piston chamber, $u'$, is a piston, $u^2$, the reciprocation of which is guided by a stem, $u^a$, adapted to slide in a vertical bore in the top of said chamber. The piston, $u^2$, is normally held in its down position by a compression coil spring, $u^4$. A bolt, $u^3$, is adjustable in the stem of the piston, as illustrated in Fig. 14, and provides a means for lifting the oil valve, $y$, a greater or lesser degree by the reciprocation of said piston, as desired.

The piston chamber, $u'$, is connected by the ducts, $w^2$, with the intermixing chamber, $w$, and said ducts are closed by the piston, $u^2$, when the latter is in its down position. See Fig. 14. Mere pressure on a body of oil contained in a tank, the latter having a discharge conduit, would not be satisfactory, because the oil is too thick. The oil, therefore, must first be atomized. This is the function of the mixing chamber, $w$. Into this chamber the oil is permitted to flow by gravity or pneumatic pressure from the oil tank $z$, and the compressed air is also admitted to this chamber through the ducts, $w^2$. The admission of the compressed air slightly in advance of the oil is preferable in order that the body of oil admitted into the mixing chamber, $w$, will be immediately atomized. Likewise, the inflow of oil into said chamber, $w$, is checked slightly in advance of the checking of the compressed air currents so as to keep the discharge conduits clear when the device is in inactive state.

In the event that steam was to be used instead of compressed air, the pipe, $t$, would have to be connected with some convenient type of steam generator, into the details of which it is not necessary to go.

The mixing chamber, $w$, is connected by a bore $x'$, with an oil chamber, $x$. A puppet-valve, $y$, is adapted to seat on the upper end of the bore $x'$, so as to cut off the flow of oil into the chamber, $w$. Said valve is provided on its lower end with guide-vanes, $y^3$, adapted to slide in the bore, $x'$. Furthermore, a centrally located lug, $y'$, is provided on the lower portion of the vanes, $y^3$, such lug being located in vertical alinement with the bolt, $u^3$. The puppet valve, $y$, is further provided with a stem, $y^4$, and a compression spring, $y^2$, is coiled around the stem of the valve, $y$, said stem, $y^4$, being adapted to be reciprocated in the valve stem guide, 3. The guide, 3, is supported centrally above the chamber, $x$, by the spokes, 4. See Fig. 12. The oil chamber, $x$, is connected directly with the pipe, $z'$, through the open spaces between the spokes, 4, and said pipe, $z'$, connects with the oil reservoir tank, $z$. In the pipe, $z'$, is a cut-off valve, $z^2$. The mixing chamber, $w$, has lateral outlets $w'$ (compare Figs. 4 and 11) to which are connected the pipes, 2, through which the ejected oil is conducted to the wheel flanges. The pipes, 2, extend to each side of the truck, and at their extremities they have bifurcated nozzles, 6, arranged to divide the flow of oil into two sprays discharging against the opposite faces of the wheel flange as shown in Fig. 5. Furthermore, the ducts, $w^2$, are provided with adjustable needle valves, 7, so as to regulate the strength of the compressed air currents.

The slotted crank arms, $o$, $o'$, are positioned reversely with respect to each other, (see Fig. 6). The pendent arms $p$, $p'$, are each provided with stud-pins, $p^2$, engaging with the slots, $o^2$, of the crank arms, $o$, $o'$, and each arm $p$, $p'$, has an idling movement in one direction, the length of the slot, but engage with and rotate their related crank arm $o$, $o'$, and thereby the shafts, $l$, $l'$, when moved in an opposite direction.

Suppose now that the car is traveling in the right hand direction over the curve in the track, as shown in Fig. 9. The pendent arm, $p$, and crank arm $o$, are located as shown in the full lines of Figs. 6 and 8. When the arm, $p$, strikes the lug, $g$, the former will be thrown clockwise. The stud-pin, $p^2$, being located at the left end of the slot, $o^2$, will cause the crank arm, $o$ and therewith the shaft, $l$, to be also rotated clockwise, and the consequent throw of the arm, $r$, will, through its linked connection with the valve, $t^2$, open the latter. Compressed air will in consequence be admitted through the pipe, $t$, into the bottom of the piston chamber, $u'$, lifting the piston, $u^2$, and in so doing uncovering the inlet ports of the ducts, $w^2$, leading into the oil and air mixing chamber, $w$. Simultaneously the bolt, $u^3$, of the piston, $u^2$, strikes the lug $y'$ of the puppet valve, $y$, and by lifting the latter, permits oil to flow down into the mixing chamber, $w$, from whence the oil is then expelled by the air pressure through the pipes, 2, and out of the nozzles, 6, by which it is sprayed against the opposite faces of the flanges of the wheels as mentioned. The piston, $u^2$, will furthermore seat itself in the upper end of the chamber, $u'$, so as to close the guide bore in which the stem of the piston slides. As soon as the car has traveled forward a short distance so as to bring the pendent arm, $p$, past the abutment-lug, $g$, the former will drop back into pendent position, leaving the parts positioned as shown in the broken lines of Fig. 8. The rotation of the arm, $p$, will cause the reverse rotation of the arm, $p'$, through the medium of the gears, $k$, $k'$, and the crank arm, $o'$ will now be positioned as the crank arm, $o$, was in the first place. The passage of the car from the curve will next cause the pendent arm, $p'$, to strike the lug, $g'$, on the rail, $d'$, and thereby cause a reversal of the action previously described, thereby restoring all parts to their normal position. This action closes the valve $t^2$, and places the oil ejecting element, $s$, in its inactive state.

An auxiliary feature of my system is the providing of an independent means of control, operable from the cab of the car or any other convenient location, which may be thrown into active state, independently of the automatic devices. This separate control consists of a pipe, $u$, which by-passes the fluid under pressure from the conduit, $e'$, to the conduit, $t$, around the valve, $t^2$, and in which is a hand operated valve $u^b$, conveniently located so as to be accessible to the operator. In this way, the flanges may be oiled at any time, independently of the automatic actuating means.

In Fig. 6$^a$, I have shown an alternate construction for operating the valve in the pipe, $t$, when the shaft, $l^x$, is rotated. This construction consists in making the shaft, $l^x$, a cam-shaft, which is done by fixing a cam, $l^3$, thereon, lowering the conduit, $t$, and using the valve, $t^6$, instead of the valve, $t^2$.

The contact lugs for operating the pendent arms, $p$, $p'$, could, of course, be fixed either on the rails or the ties adjacent to the rails. Undoubtedly these arms and contact abutments could also be so arranged as to be located on one side of the track only, instead of on both sides.

In Fig. 15 I show diagrammatically an electrical means for operating the valve which controls the flow of fluid under pressure through the conduit, $t$. In this case, I use a solenoid operated valve, 20, of the well known commercial form, electrically connected through the generator, 19. Spring controlled switches, 17 and 18, normally open, are mounted on the under side of the car floor, and the circuit of the solenoid operated valve, 20, will be closed by the closure of either switch. A switch operating member, 16, is rigidly fixed on the truck of the car, and whenever the car runs on a curve, the relative movement between the car body and the truck, will cause the member, 16, to bear against and close one of the switches, 17 or 18, depending on the direction of the curve. This action will open the valve, 20, and cause the oil to be discharged to the wheel flanges in the manner previously described.

As soon as the car passes onto a straight stretch of track, the car body and trucks will resume normal position, and the circuit of the solenoid operated valve, 20, will be broken, thereby allowing said valve to close and as a consequence, replacing all parts to their inactive state.

I claim:

1. A device of the character described comprising in combination with a lubricant reservoir and a source of fluid under pressure, a lubricant ejector having an atomizing chamber, a conduit from the reservoir to said chamber, a valve controlling the admission of lubricant into said atomizing chamber, a conduit connecting said ejector with said source of fluid pressure, a valve operated by fluid pressure controlling the admission of fluid from said conduit into said atomizing chamber, means for operating the valve controlling the admission of fluid into said atomizing chamber, in time with said valve controlling the admission of the lubricant into the latter, a valve controlling the passage of fluid through the conduit connecting the ejector with said source of fluid pressure, means for operating the latter valve, a discharge conduit leading from the atomizing chamber of the ejector, and a nozzle element at the extremity of such discharge conduit.

2. A device of the character described comprising in combination with a lubricant reservoir and a source of fluid under pressure, a lubricant ejector having an atomizing chamber, a conduit from the reservoir to said chamber, a valve controlling the admission of lubricant into said atomizing chamber, a conduit connecting said ejector with said source of fluid pressure, a valve operated by fluid pressure controlling the admission of fluid from said conduit into said atomizing chamber, means for operating the valve controlling the admission of fluid into said atomizing chamber, in time with said valve controlling the admission of the lubricant into the latter, a valve controlling the passage of fluid through the conduit connecting the ejector with said source of fluid pressure, means for operating the latter valve, said means including a movable member adapted for being operated by impact with a fixed abutment, a discharge conduit leading from the atomizing chamber of the ejector, and a nozzle element at the extremity of such discharge conduit.

3. A device of the character described comprising in combination with a lubricant reservoir and a source of fluid under pressure, a lubricant ejector having an atomizing chamber, a conduit from the reservoir to said chamber, a valve controlling the admission of lubricant into said atomizing chamber, a conduit connecting said ejector with said source of fluid pressure, a valve operated by fluid pressure controlling the admission of fluid from said conduit into said atomizing chamber, means for operating the valve controlling the admission of fluid into said atomizing chamber, in time with said valve controlling the admission of the lubricant into the latter, a valve controlling the passage of fluid through the conduit connecting the ejector with said source of fluid pressure, means for operating the latter valve comprising a pair of parallel rotatable shafts, a connection causing the rotation of one shaft to reversely rotate the other, a crank arm on each shaft, a pendent arm pivoted on each shaft near such crank arm, and a connection between the related crank-arm and pendent arm adapted to permit each to have some movement independent of the other, a discharge conduit leading from the atomizing chamber of the ejector, and a nozzle element at the extremity of such discharge conduit.

4. In a device of the character described comprising in combination with a lubricant reservoir and a source of fluid under pressure, a lubricant ejector having an atomizing chamber, a conduit from the reservoir to said chamber, a valve controlling the admission of lubricant into said atomizing chamber, a conduit connecting said ejector with said source of fluid pressure, a valve operated by fluid pressure controlling the admission of fluid from said conduit into said atomizing chamber, means for operating the valve controlling the admission of fluid into said atomizing chamber in advance of said valve controlling the admission of the lubricant into the latter, means for operating the latter valve.

5. In a device of the character described comprising in combination with a lubricant reservoir and a source of fluid under pressure, a lubricant ejector having an atomizing chamber, a conduit from the reservoir to said chamber, a valve controlling the admission of lubricant into said atomizing chamber, a conduit connecting said ejector with said source of fluid pressure, a valve operated by fluid pressure controlling the admission of fluid from said conduit into said atomizing chamber, the valves controlling the admission of lubricant and of the atomizing fluid into said atomizing chamber being alined one over the other and the latter valve having a stem impinging against and lifting the former valve, means for operating the latter valve.

6. In a device of the character described comprising in combination with a lubricant reservoir and a source of fluid under pressure, a lubricant ejector having an atomizing chamber, a conduit from the reservoir to said chamber, a valve controlling the admission of lubricant into said atomizing chamber, a conduit connecting said ejector with said source of fluid pressure, a valve operated by fluid pressure controlling the admission of fluid from said conduit into said atomizing chamber, the valves controlling the admission of lubricant and of the atomizing fluid into said atomizing chamber being alined one over the other and the latter valve having an adjustable stem impinging against and lifting the former valve, means for operating the latter valve.

7. A device of the character described comprising in combination with a lubricant reservoir and a source of fluid under pressure, a lubricant ejector having an atomizing chamber, a conduit from the reservoir to said chamber, a valve controlling the admission of lubricant into said atomizing chamber, a conduit connecting said ejector with said source of fluid pressure, a valve operated by fluid pressure controlling the admission of fluid from said conduit into said atomizing chamber, means for operating the valve controlling the admission of fluid into said atomizing chamber, in time with said valve controlling the admission of the lubricant into the latter, a valve controlling the passage of fluid through the conduit connecting the ejector with said source of fluid pressure, means for operating the latter valve comprising a pair of parallel rotatable shafts, a connection causing the rotation of one shaft to reversely rotate the other, a crank arm on each shaft, a pendent arm pivoted on each shaft near such crank-arm, and a slot-and-pin connection between such pendent arm and the adjacent crank-arm, whereby the pendent arm and the crank-arm are permitted some movement independent of each other.

8. In means of the character described comprising a lubricant ejector, and a valve controlling such ejector, means for operating such valve comprising a pair of parallel shafts, connection causing the rotation of one shaft to reversely rotate the other, a crank-arm on each shaft, pendent arm pivoted on each shaft near such crank arm, and connections between the related crank-arm and pendent arm adapted to permit each to have some movement independent of the other.

9. In means of the character described comprising a lubricant ejector actuated by fluid pressure, a source of fluid under pressure, a conduit connecting the ejector with such source of fluid under pressure, a valve in such conduit, and means for operating such valve, said means including a movable member adapted for being operated by impact with a fixed abutment.

10. In means of the character described, in combination with a lubricant reservoir and a source of fluid under pressure a lubricant-ejector comprising a chamber for holding lubricant, a conduit connecting said chamber to said reservoir, an atomizing chamber, a passage-way connecting the latter with said chamber for holding lubricant, a spring-controlled valve controlling such passageway, a piston-chamber, a conduit connecting the latter with said source of fluid, a port connecting said piston chamber with said atomizing chamber, a spring-controlled piston in the piston-chamber, such piston normally covering said port, said piston having a stem arranged to have impact against the valve controlling said passageway, a discharge conduit leading from the atomizing chamber of the ejector, a nozzle element at the extremity of such discharge conduit, a valve controlling the passage of fluid from said source into said piston chamber, and means for operating the latter valve, such means including a movable member adapted for being operated by impact with a fixed abutment.

11. In means of the character described, in combination with a lubricant reservoir and a source of fluid under pressure a lubricant-ejector comprising a chamber for holding lubricant, a conduit connecting said chamber to said reservoir, an atomizing chamber, a passage-way connecting the latter with said chamber for holding lubricant, a spring-controlled valve controlling such passageway, the stem of such valve provided with lateral guide-webs partitioning said passage-way, a piston-chamber, a conduit connecting the latter with said source of fluid, a port connecting said piston-chamber with said atomizing chamber, a spring-controlled piston in the piston-chamber, such piston normally covering said port, said piston having a stem arranged to have impact against said stem of the valve controlling said passageway, a discharge conduit leading from the atomizing chamber of the ejector, a nozzle element at the extremity of such discharge conduit, a valve controlling the passage of fluid from said source into said piston chamber, and means for operating the latter valve, such means including a movable member adapted for being operated by impact with a fixed abutment.

12. In means of the character described, in combination with a lubricant reservoir and a source of fluid under pressure a lubricant-ejector comprising a chamber for holding lubricant, a conduit connecting said chamber to said reservoir, an atomizing chamber, a passage-way connecting the latter with said chamber for holding lubricant, a spring-controlled valve controlling such passage-way, a piston-chamber, a conduit connecting the latter with said source of fluid, a port connecting said piston-chamber with said atomizing chamber, a spring-controlled piston in the piston-chamber such piston normally covering said port, said piston having a stem arranged to have impact against the valve controlling said passageway, a discharge conduit leading from the atomizing chamber of the ejector, a nozzle element at the extremity of such discharge conduit, a valve controlling the passage of fluid from said source into said piston chamber and means for operating the latter valve, such means including a movable member adapted for being operated by impact with a fixed abutment.

13. In means of the character described, in combination with a lubricant reservoir and a source of fluid under pressure a lubricant-ejector comprising a chamber for holding lubricant, a conduit connecting said chamber to said reservoir, an atomizing chamber, a passage-way connecting the latter with said chamber for holding lubricant, a spring-controlled valve controlling such passageway, a piston-chamber, a conduit connecting the latter with said source of fluid, a port connecting said piston-chamber with said atomizing chamber, a spring-controlled piston in the piston-chamber, such piston normally covering said port, said piston having a longitudinally adjustable stem arranged to have impact against the valve controlling said passageway, a discharge conduit leading from the atomizing chamber of the ejector, a nozzle element at the extremity of such discharge conduit, a valve controlling the passage of fluid from said source into said piston chamber and means for operating the latter valve, such means including a movable member adapted for being operated by impact with a fixed abutment.

14. In means of the character described, in combination with a lubricant reservoir and a source of fluid under pressure, a lubricant-ejector comprising a chamber for holding lubricant, a conduit connecting said chamber to said reservoir, an atomizing chamber, a passage-way connecting the latter with said chamber for holding lubricant, a spring-controlled valve controlling such passageway, the stem of such valve provided with lateral guide-webs partitioning said passage-way, a piston-chamber, a conduit connecting the latter with said source of fluid, a port connecting said piston-chamber with said atomizing chamber, a spring-controlled piston in the piston-chamber, such piston normally covering said port, said piston having a longitudinally adjustable stem arranged to have impact against the valve controlling said passageway, a discharge conduit leading from the atomizing chamber of the ejector, a nozzle element at the extremity of such discharge conduit, a valve controlling the passage of fluid from said source into said piston chamber and means for operating the latter valve, such means including a movable member adapted for being operated by impact with a fixed abutment.

15. In means of the character described, in combination with a lubricant reservoir and a source of fluid under pressure, a lubricant-ejector comprising a chamber for holding lubricant, a conduit connecting said chamber to said reservoir, an atomizing chamber, a passage-way connecting the latter with said chamber for holding lubricant, a spring-controlled valve controlling such passageway, the stem of such valve provided with lateral guide-webs partitioning said passage-way, a piston-chamber a conduit connecting the latter with said source of fluid, a port connecting said piston-chamber with said atomizing chamber, a valve for regulating the area of said port, a spring-controlled piston in the piston-chamber, such piston normally covering said port, said piston having a longitudinally adjustable stem arranged to have impact against said stem of the valve controlling said passageway, a discharge conduit leading from the atomizing chamber of the ejector, a nozzle element at the extremity of such discharge conduit, a valve controlling the passage of fluid from said source into said piston chamber, and means for operating the latter valve, such means including a movable member adapted for being operated by impact with a fixed abutment.

AUGUST W. OLSEN.

Witnesses:
Wm. C. Schmitt,
D. W. Crabb.